(12) United States Patent
Kreeger et al.

(10) Patent No.: US 8,676,980 B2
(45) Date of Patent: Mar. 18, 2014

(54) DISTRIBUTED LOAD BALANCER IN A VIRTUAL MACHINE ENVIRONMENT

(75) Inventors: Lawrence Kreeger, Fremont, CA (US); Elango Ganesan, Palo Alto, CA (US); Michael Freed, Pleasanton, CA (US); Geetha Dabir, Saratoga, CA (US)

(73) Assignee: Cisco Technology, Inc., San Jose, CA (US)

( * ) Notice: Subject to any disclaimer, the term of this patent is extended or adjusted under 35 U.S.C. 154(b) by 145 days.

(21) Appl. No.: 13/065,428

(22) Filed: Mar. 22, 2011

(65) Prior Publication Data

US 2012/0246637 A1 Sep. 27, 2012

(51) Int. Cl.
*G06F 15/173* (2006.01)

(52) U.S. Cl.
USPC .......................................... 709/226

(58) Field of Classification Search
USPC .......................................... 709/226
See application file for complete search history.

(56) References Cited

U.S. PATENT DOCUMENTS

| | | | |
|---|---|---|---|
| 6,205,477 B1 | 3/2001 | Johnson et al. | |
| 6,883,028 B1 | 4/2005 | Johnson et al. | |
| 7,222,195 B2 | 5/2007 | Das et al. | |
| 7,451,209 B1 | 11/2008 | Schieber | |
| 7,483,430 B1 | 1/2009 | Yuan et al. | |
| 2002/0129165 A1* | 9/2002 | Dingsor et al. | 709/246 |
| 2003/0174706 A1* | 9/2003 | Shankar et al. | 370/393 |
| 2004/0042456 A1* | 3/2004 | Dittmann et al. | 370/392 |
| 2006/0020704 A1* | 1/2006 | Balasuriya | 709/227 |
| 2007/0088822 A1* | 4/2007 | Coile et al. | 709/224 |
| 2008/0120691 A1* | 5/2008 | Flewallen et al. | 726/1 |
| 2009/0089793 A1* | 4/2009 | Nandagopal et al. | 718/105 |

OTHER PUBLICATIONS http://www.zeus.com/landing/traffic-manager-6.html#link7.

* cited by examiner

*Primary Examiner* — Benjamin R Bruckart
*Assistant Examiner* — Nicholas Celani
(74) *Attorney, Agent, or Firm* — Cindy Kaplan

(57) ABSTRACT

In one embodiment, a method includes receiving a request packet at a flow director in communication with a plurality of servers, each server comprising a virtual load balancer module and one or more virtual machines and forwarding the request packet to one of the virtual load balancer modules at one of the servers. The virtual load balancer module is configured to select one of the virtual machines to receive the request packet and transmit a response packet. The response packet is transmitted without passing through the flow director. An apparatus for load balancing in a virtual machine environment is also disclosed.

18 Claims, 8 Drawing Sheets

DISTRIBUTED LOAD BALANCER IN A VIRTUAL MACHINE ENVIRONMENT

TECHNICAL FIELD

The present disclosure relates generally to load balancing in a virtual machine environment.

BACKGROUND

Virtualization is a technology which allows one computer to do the job of multiple computers by sharing resources of a single computer across multiple systems. Through the use of virtualization, multiple operating systems and applications can run on the same computer at the same time, thereby increasing utilization and flexibility of hardware. For example, virtualization allows servers to be decoupled from underlying hardware, thus resulting in multiple virtual machines sharing the same physical server hardware. Load balancing is used to distribute client or server requests across multiple servers.

DESCRIPTION OF EXAMPLE EMBODIMENTS

Overview

Figure 1:
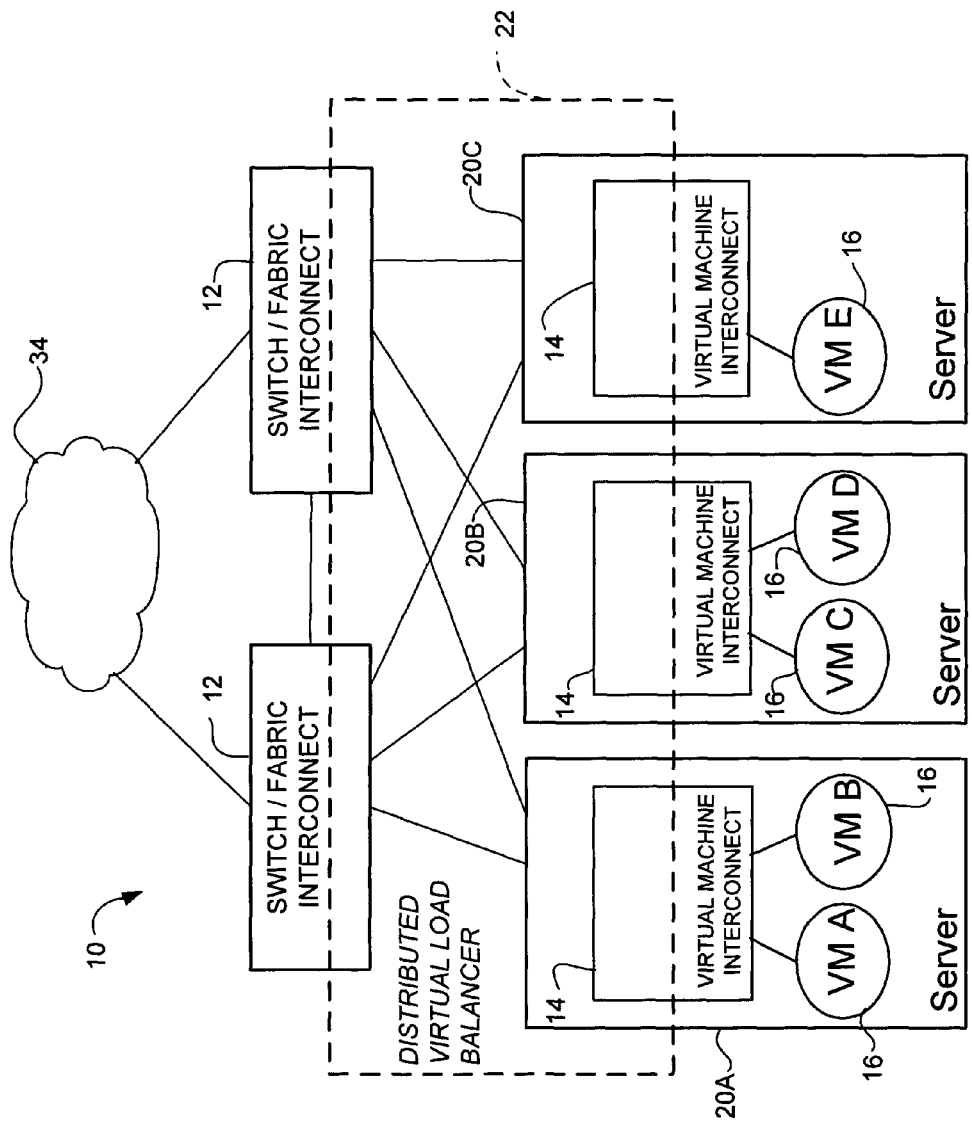
FIG. 1 illustrates an example of a network in which embodiments described herein may be implemented.

In one embodiment, a method generally comprises receiving a request packet at a flow director in communication with a plurality of servers, each server comprising a virtual load balancer module and one or more virtual machines, and forwarding the request packet to one of the virtual load balancer modules. The virtual load balancer module is configured to select one of the virtual machines to receive the request packet and transmit a response packet. The response packet is transmitted without passing through the flow director.

In another embodiment, an apparatus generally comprises an ingress interface for receiving a request packet, an egress interface in communication with a plurality of servers, each server comprising a virtual load balancer module and one or more virtual machines, and a flow director configured to forward the request packet to one of the virtual load balancer modules. The virtual load balancer module is configured to select one of the virtual machines to receive the request packet. The flow director is configured such that a response packet is transmitted without passing through the flow director.

In yet another embodiment, an apparatus generally comprises an interface for receiving request packets from a flow director in communication with a plurality of servers comprising a plurality of virtual machines, one or more of the virtual machines, and a virtual load balancer module configured to load balance the request packets across the virtual machines and transmit load balancing information to the flow director.

Example Embodiments

The following description is presented to enable one of ordinary skill in the art to make and use the embodiments. Descriptions of specific embodiments and applications are provided only as examples and various modifications will be readily apparent to those skilled in the art. The general principles described herein may be applied to other embodiments and applications. Thus, the embodiments are not to be limited to those shown, but are to be accorded the widest scope consistent with the principles and features described herein. For purpose of clarity, features relating to technical material that is known in the technical fields related to the embodiments have not been described in detail.

The embodiments described herein provide a distributed load balancer for use in a virtual machine environment. The distributed load balancer provides in-path load balancing for improved performance and scalability.

The embodiments operate in the context of a data communications network including multiple network elements. Some of the elements in the network may be network devices such as servers, switches, routers, and the like. Referring now to the drawings, and first to FIG. 1, an example of a network 10 that may implement embodiments described herein is shown. The network 10 may be configured for use as a data center or any other type of network. The network 10 includes switches (fabric interconnects) 12, which may be hardware implemented network switches or other network devices configured to perform switching or routing functions. In the example shown in FIG. 1, the switches 12 are in communication with three network devices (e.g., servers, hosts) 20A, 20B, 20C.

Each server 20A, 20B, 20C includes a virtual machine interconnect 14 and one or more virtual machines (VM A, VM B, VM C, VM D, VM E) (referred to as real server virtual machines) 16. As described below with respect to FIGS. 3 and 4, the virtual machine interconnect 14 may be implemented in hardware (e.g., network interface card (NIC)) or in software (e.g., virtual switch). In the example shown in FIG. 1, VM A and VM B are located at server 20A, VM C and VM D are located at server 20B, and VM E is located at server 20C, each server being physically separate from the other servers. The virtual machines 16 may be moved between servers 20A, 20B, 20C based on traffic patterns, hardware resources, or other criteria. A virtual machine monitor (e.g., hypervisor) may be installed on the server 20A, 20B, 20C and used to dynamically allocate hardware resources to the virtual machines 16.

The switches 12 may also be in communication with a management station (e.g., virtualization management platform such as VMware virtual center management station, available from VMware of Palo Alto, Calif.) (not shown). The management station or one or more management functions may also be integrated into the switches 12 or servers 20A, 20B, 20C. For example, the switch 12 may include a Unified Computing System (UCS) manager, available from Cisco Systems, Inc. of San Jose Calif.

The switches 12 may be in communication with one or more networks 34 (e.g., local area network (LAN), storage area network (SAN)) through any number of nodes, including, for example, Cisco Nexus series switches or Multilayer Data Center Switches. The network may be configured to carry Ethernet, Fibre Channel, or Fibre Channel over Ethernet, for example. One or more network devices (e.g., fabric extenders) may be located between the switches 12 and servers 20A, 20B, 20C. The network 10 may include any number of servers, including, for example, blade servers or rackmount servers. The switch 12 may be, for example, a Cisco UCS 6100 series fabric interconnect or a Cisco Nexus 5000 series switch.

A distributed load balancer (also referred to as a distributed virtual load balancer (DVLB) or a distributed virtual application delivery controller (DVADC)) 22 is inserted into the incoming traffic path and tightly integrated with the virtual machine interconnect 14 at each server 20A, 20B, 20C to provide a highly scalable and high performance load balancing system in a virtual machine environment. As described below, the DVLB 22 includes components located at one or more of the servers 20A, 20B, 20C and switches 12.

The DVLB 22 distributes client and server requests across the virtual machines 16. The distributed load balancer 22 is inserted in the traffic path and is hidden from a user, thereby allowing flexibility with regard to the relationship of a virtual server IP (Internet Protocol) VLAN (virtual local area network)/subnet to the server subnets. Traffic is automatically/transparently intercepted for load balancing processing by a transparent redirector (flow director) so that explicit insertion of the load balancer is not required by the user. Traffic that does not require load balancing processing may bypass the distributed load balancer 22.

It is to be understood that the network shown in FIG. 1 and described herein is only one example and that other topologies and network devices may be used, without departing from the scope of the embodiments.

Figure 2:
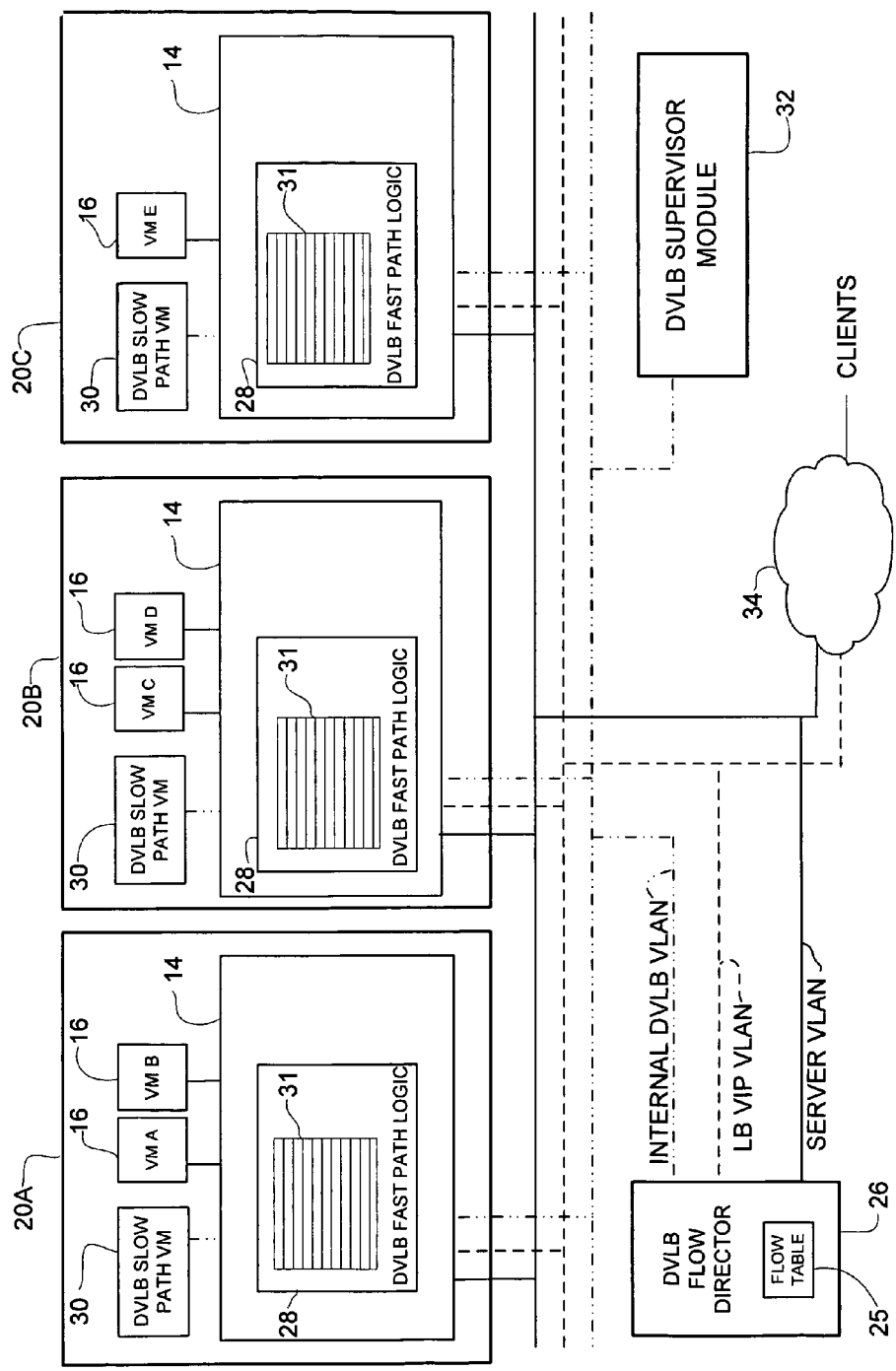
FIG. 2 illustrates an example of a distributed virtual load balancer in the network of FIG. 1.

FIG. 2 illustrates components of the distributed virtual load balancer (DVLB) 22 of FIG. 1, in accordance with one embodiment. The distributed load balancer includes a flow director 26, virtual load balancer module (also referred to as a virtual application delivery controller (VADC) module) and a supervisor module 32. As described below, the virtual load balancer module includes a fast path portion 28 and a slow path portion 30.

Clients are in communication with the servers 20A, 20B, 20C via network 34, which includes nodes such as routers, switches, or other network devices configured to perform routing or forwarding functions. A network device (e.g., router) at the network 34 communicates with the servers 20A, 20B, 20C via a real server VLAN and load balancer VIP (virtual IP) VLAN, as shown in FIG. 2. Communication among the flow director 26, virtual load balancer module 28, 30, and supervisor module 32 occurs on an internal distributed virtual load balancer VLAN (internal DVLB VLAN). The internal VLAN and any VLAN hosting a VIP flows to each server 20A, 20B, 20C participating in the distributed virtual load balancing.

The supervisor module 32 operates as a coordinator and manager for the distributed virtual load balancer 22. The supervisor module 32 performs centralized management and control functions to coordinate the flow director 26 and virtual load balancer modules 28, 30. Data does not flow through the supervisor module 32 and the supervisor module is not involved in load balancing decisions. The supervisor module 32 manages the addition or removal of virtual load balancer modules and is a single point of management for status and statistics that the supervisor module gathers from the other components of the system. The supervisor module 32 is also configured to check that data connectivity to the virtual load balancer modules is available for the virtual machines 16 and internal VLANs to the servers hosting the virtual load balancer modules, as well as to the internal ports leading to the flow director 26. The supervisor module 32 may be located within the switch 12, at one of the servers 20A, 20B, 20C, or another server or network device. For example, the DVLB supervisor module 32 may be incorporated in a Unified Computing System (UCS) manager at the switch 12 or a virtual supervisor module (described below) in communication with the switch 12.

The flow director 26 operates to distribute flows to the virtual load balancer modules running on the servers 20A, 20B, 20C. The flow director 26 identifies new flows and chooses a virtual load balancer module to process a new flow. The flow director 26 also responds to requests from the virtual load balancer modules to direct all packets for a flow to a particular virtual load balancer module, which may be different from the initial virtual load balancer module selected by the flow director. The flow director 26 is configured to reply to ARP (Address Resolution Protocol) requests for virtual IP addresses. Thus, incoming traffic naturally flows to the flow director 26 using conventional MAC (Media Access Control) address learning. There is no need for a network administrator to explicitly route/bridge traffic to a load balancer, as is typically required with conventional load balancers.

In one embodiment, when the flow director 26 detects new flows that are not already in its flow table 25, it distributes the flows in a pseudo-random manner to all virtual load balancer modules that are not currently overloaded and adds a new flow table entry for the flow. The flow director 26 subsequently responds to change flow requests from the virtual load balancer modules to change the destination of a flow to a more optimal virtual load balancer module, as well as flow entry removal requests. The flow director 26 is only in the inbound data path, therefore, all outgoing traffic flows directly from the servers 20A, 20B, 20C to the clients without passing through the flow director. Since return traffic does not have to go back to the flow director 26, an additional hop is avoided, thereby improving latency of the transaction. This also prevents the flow director 26 from becoming a point of congestion in the system. Since the flow director 26 only needs to process incoming traffic towards the servers, very large amounts of outgoing traffic can be supported. The request bandwidth is typically much smaller than the response bandwidth. Therefore, by avoiding sending the return traffic through the flow director, high performance load balancers may be provided.

Figure 4:
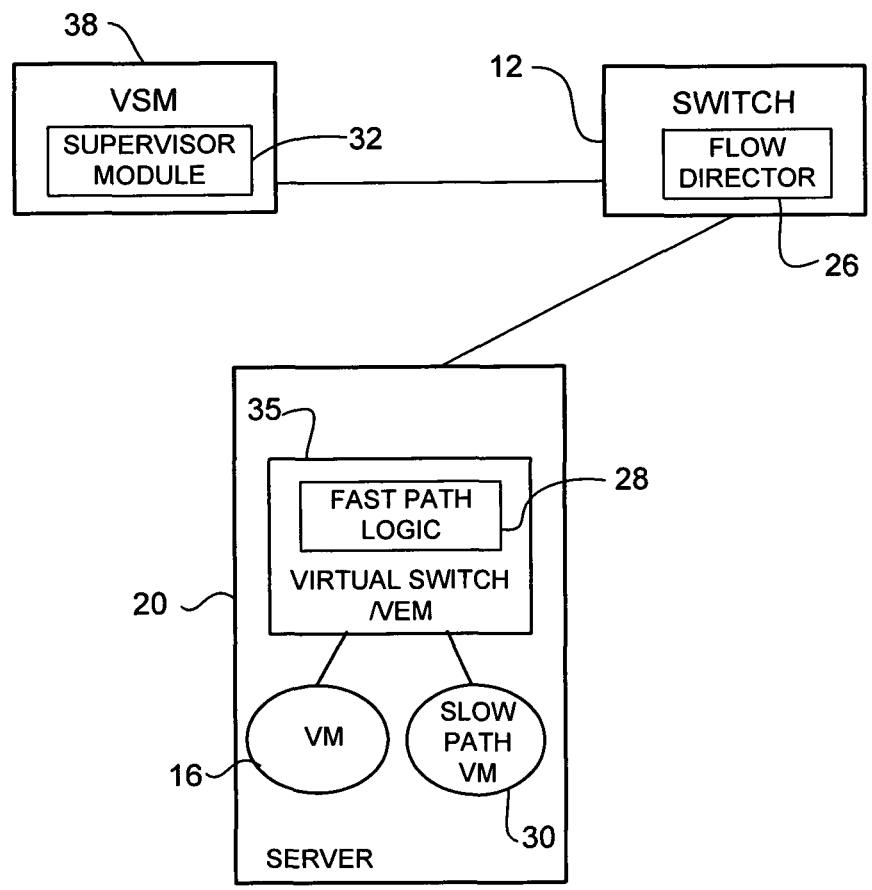
FIG. 4 illustrates the flow director located at the switch and in communication with a virtual switch at the server in the network of FIG. 1, in accordance with another embodiment.
Figure 5:
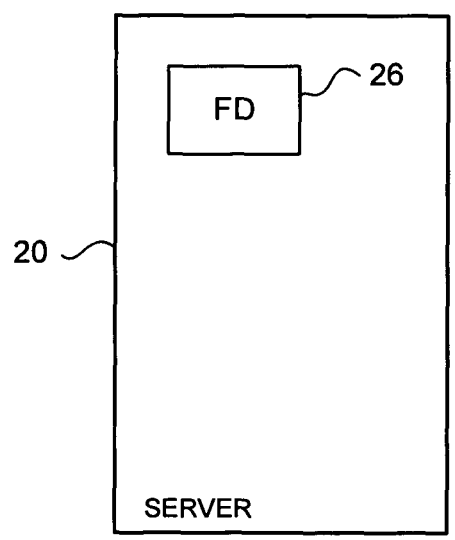
FIG. 5 illustrates the flow director located at the server in the network of FIG. 1, in accordance with another embodiment.

As described below with respect to FIGS. 3, 4, and 5, the flow director 26 may be located at the switch 12 (FIGS. 3 and 4) or at one of the servers 20A, 20B, 20C (FIG. 5). The flow director 26 may also be located at another network device (e.g., server, switch, appliance) in communication with the servers 20A, 20B, 20C.

As noted above, the virtual load balancer module comprises a fast path portion 28 and slow path portion 30. The fast path logic 28 is used to identify flows and perform NAT (network address translation)/PAT (port address translation) and VLAN hopping functions. The fast path logic 28 includes one or more flow tables 31. The slow path 30 may be implemented at a virtual machine at the server and is configured to perform load balancing processing. The slow path virtual machines 30 may be automatically deployed and maintained.

As described below, in some cases both the fast path 28 and slow path 30 are used to direct traffic to one of the virtual machines 16. In other cases, such as simple layer 4 based load balancing after the flow has been associated with one of the virtual machines 16, only the fast path 28 is used to process a packet. The distributed virtual load balancer can be easily scaled by adding or removing load balancer virtual machines 30.

One or more of the servers 20A, 20B, 20C may be configured with the fast path portion 28 and no slow path portion 30. In this case, load balancing is performed at one of the slow path virtual machines 30 installed on one of the other servers and entries are created in the fast path flow table 31 for virtual machines at the server.

Traffic may also be sent to a physical server which does not include fast path logic 28 by using ACLs (access control lists) at the flow director 26 or switch 12 to redirect traffic to a slow path virtual machine 30 on a different server.

As described below with respect to FIGS. 3 and 4, the fast path 28 operations may be performed in hardware at a network interface card (FIG. 3) or in software at a virtual switch (FIG. 4) located at the server, for example.

Figure 3:
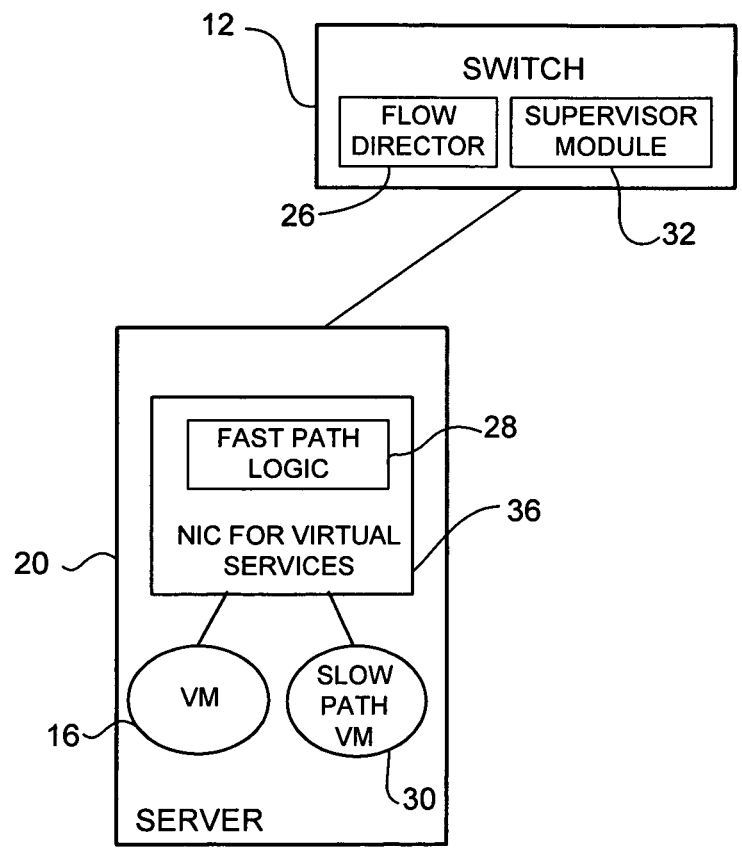
FIG. 3 illustrates a flow director located at a switch and in communication with a network interface card at a server in the network of FIG. 1, in accordance with one embodiment.

FIG. 3 illustrates an embodiment in which the flow director 26 and supervisor module 32 are located at the switch 12 and the fast path logic 28 is located at a network interface card (controller) 36 at the server 20. The fast path logic function may be performed, for example, in hardware acceleration at the server network interface card 36. The flow director 26 may be in the form of a general expansion module (GEM) or mezzanine card, for example. In one embodiment, multiple ASICs (application specific integrated circuits) (e.g., three per GEM) may reside on the same flow director card, each working independently of each other.

FIG. 4 illustrates an embodiment in which the virtual machine interconnect is a virtual switch (also referred to herein as a virtual Ethernet module (VEM)) 35 and the flow director 26 is installed at the switch 12. The switch 12 is in communication with a virtual supervisor module (VSM) 38, which includes the DVLB supervisor module 32. The VSM 38 may be located in a network device (e.g., physical appliance) in communication with the servers 20 via the switch 12. The virtual supervisor module 38 may also be a virtual appliance (e.g., virtual machine) installed at one of the servers 20 or the VSM may be installed at one of the switches 12.

The virtual supervisor module 38 is configured to provide control/management plane functionality for the virtual machines 16 and control multiple virtual switches 35. The virtual switch 35 provides switching capability at the server 20 and operates as a data plane associated with the control plane of the VSM 38. In one embodiment, the virtual supervisor module 38 and virtual Ethernet module 35 operate together to form a distributed virtual switch (e.g., NEXUS 1000V series switch, available from Cisco Systems, Inc. of San Jose, Calif.).

FIG. 5 illustrates an embodiment in which the flow director 26 is located at a server 20. The flow director 26 may be installed at the server or run on a virtual machine installed at the server.

It is to be understood that the embodiments illustrated in FIGS. 3, 4, and 5 are only examples and that other configurations or arrangements of the flow director 26, fast path logic 28, and supervisor module 32 may be used, without departing from the scope of the embodiments.

Figure 6:
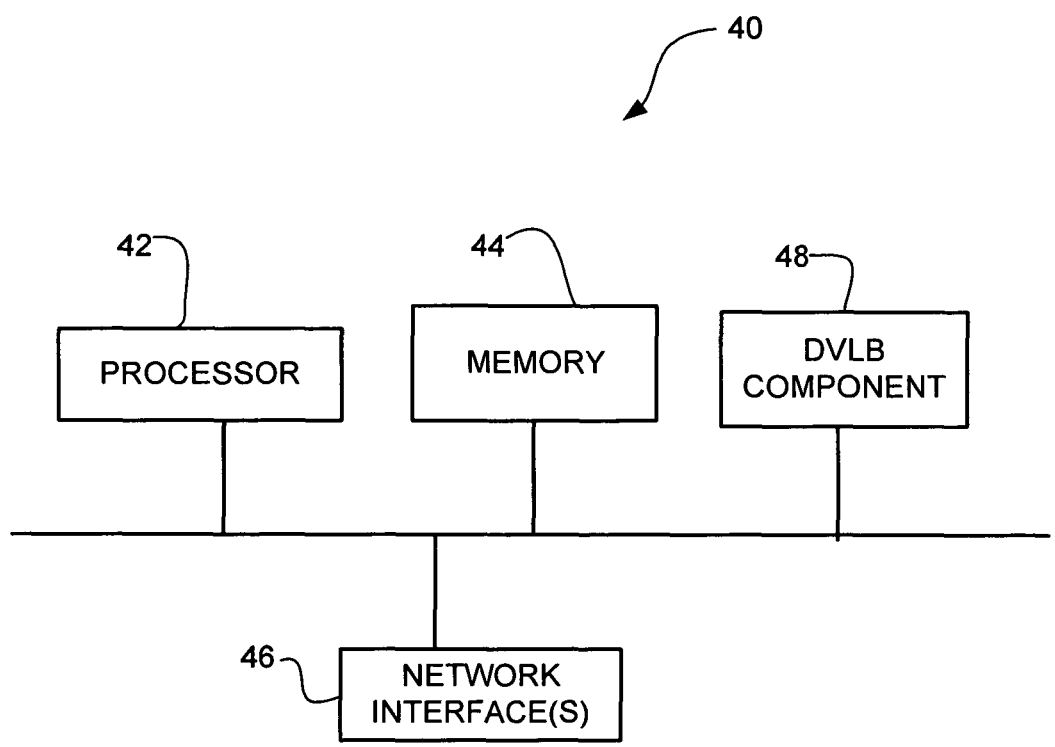
FIG. 6 illustrates an example of a network device useful in implementing embodiments described herein.

An example of a network device (e.g., server, switch) 40 that may be used to implement embodiments described herein is shown in FIG. 6. In one embodiment, the network device 40 is a programmable machine that may be implemented in hardware, software, or any combination thereof. The network device 40 includes one or more processors 42, memory 44, and one or more network interfaces 46 (e.g., ingress interface, egress interface). The network device 40 includes one or more components 48 of the distributed virtual load balancer (e.g., flow director 26, virtual load balancer module 28, 30, supervisor module 32). Memory 44 may be a volatile memory or non-volatile storage, which stores various applications, modules, and data for execution and use by the processor 42.

Logic may be encoded in one or more tangible media for execution by the processor 42. For example, the processor 42 may execute codes stored in a computer-readable medium such as memory 44. The computer-readable medium may be, for example, electronic (e.g., RAM (random access memory), ROM (read-only memory), EPROM (erasable programmable read-only memory)), magnetic, optical (e.g., CD (compact disc), DVD (digital video disc)), electromagnetic, semiconductor technology, or any other suitable medium.

The network interface 46 may comprise, for example, one or more interfaces (e.g., cards, adapters, ports) for receiving data, transmitting data to other network devices, and forwarding received data to internal components (e.g., flow director, virtual load balancer modules, etc.). For example, the switch 12 includes one or more ingress interfaces for receiving request packets from clients and egress interfaces in communication with the servers 20. The server 20 includes interfaces for receiving request packets and transmitting response packets. The interfaces are also used for communication between the flow director, virtual load balancer module, and supervisor module. The terms 'ingress' and 'egress' as used herein refer to interfaces receiving or transmitting packets. Thus, an ingress interface at which packets are received may also be used as an egress interface to transmit packets and vice versa.

It is to be understood that the network device 40 shown in FIG. 6 and described above is only one example and that different configurations of network devices may be used.

Figure 7:
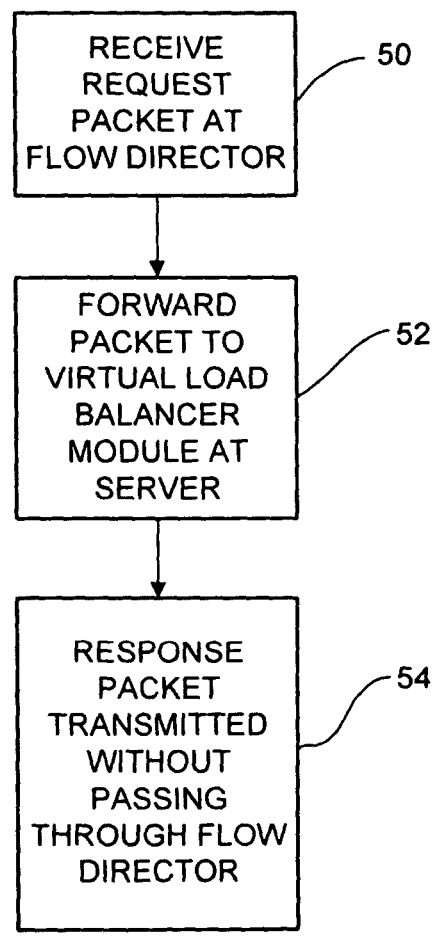
FIG. 7 is a flowchart illustrating an overview of a process for load balancing traffic in a virtual machine environment, in accordance with one embodiment.

FIG. 7 is a flowchart illustrating an overview of a process for load balancing traffic in a virtual machine environment, in accordance with one embodiment. A request packet is received at the flow director 26 at step 50. The request packet may be, for example, a TCP (Transmission Control Packet) SYN (synchronize) packet for an L3/L4 HTTP (Hypertext Transfer Protocol) session initiation, a TCP packet for an HTTP request, or any other client or server request. As shown in FIG. 1, the flow director 26 is in communication with a plurality of servers 20A, 20B, 20C, each server including a virtual load balancer module (e.g., fast path 28 and slow path 30) and one or more virtual machines 16. Traffic directed to the servers 20A, 20B, 20C is automatically intercepted for load balancing. The flow director 26 forwards the packet to the virtual load balancer module at one of the servers (step 52). In one embodiment, the flow director 26 performs a look up in the flow table 25 for an entry for a flow associated with the packet. The look up may be any type of search performed in a data structure. If the entry is found, the flow director 26 forwards the packet to the virtual load balancer module identified in the flow table 25. If no entry is found, the flow director 26 selects one of the virtual load balancer modules at one of the servers and forwards the packet to the virtual load balancer module. The virtual load balancer module is configured to select one of the virtual machines 16 to receive the request packet and transmit a response packet. The response packet is transmitted to the client without passing through the flow director 26 (step 54).

Figure 8:
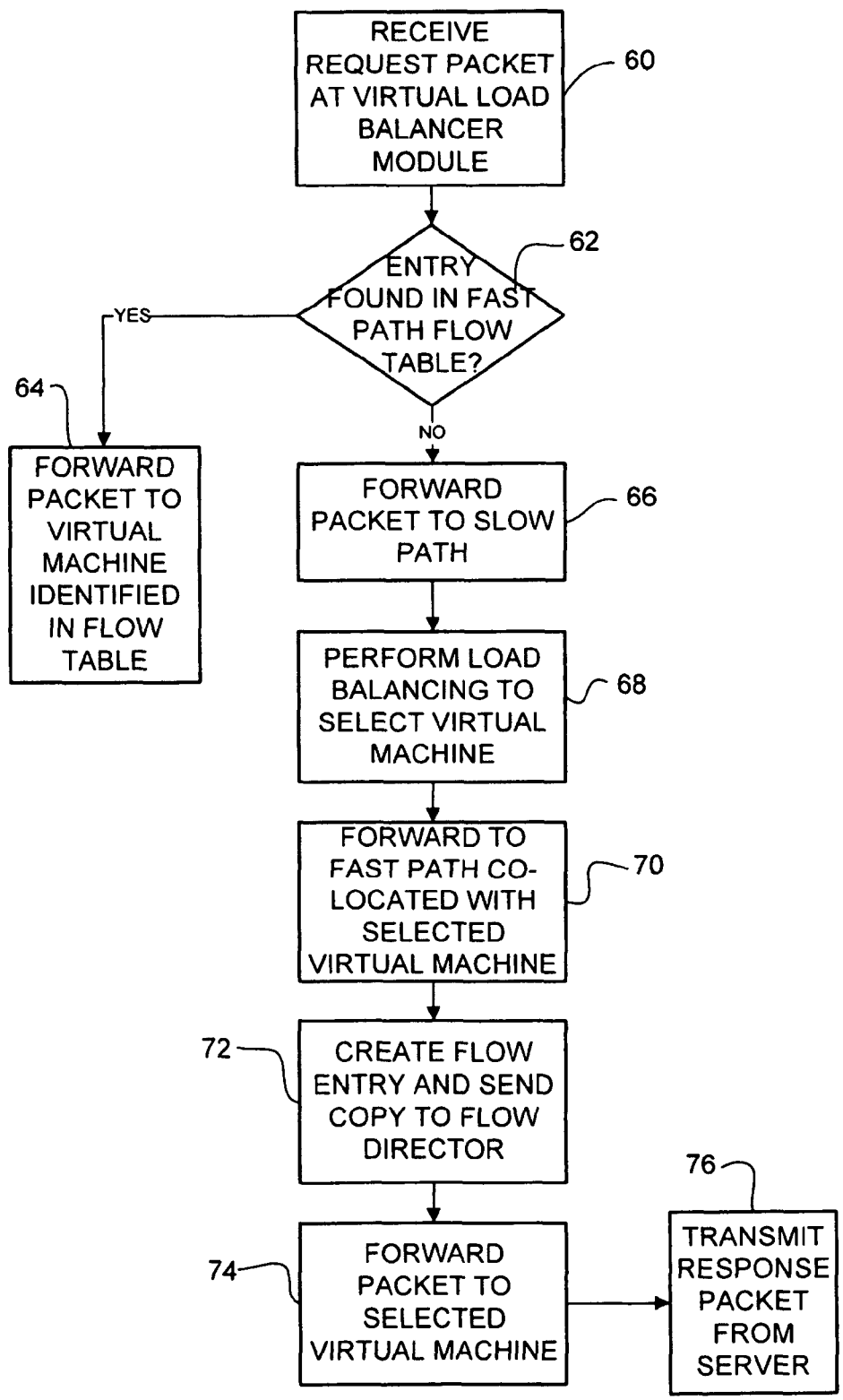
FIG. 8 is a flowchart illustrating a process for load balancing at a virtual load balancer module, in accordance with one embodiment.

FIG. 8 illustrates details of operation at the virtual load balancer module, in accordance with one embodiment. Upon receiving the request packet from the flow director 26, the fast path 28 looks for the flow in its flow table 31 (steps 60 and 62). If an entry is found, the packet is forwarded to the virtual machine 16 identified in the flow table 31 (step 64). If no entry is found, the packet is forwarded to the slow path 30 at the same server as the fast path 28 (step 66). The slow path 30 performs load balancing to select one of the virtual machines 16 (step 68). The virtual machine 16 may be located at the same server as the slow path virtual machine 30 or another server. The packet is then forwarded to the fast path logic co-located with the selected virtual machine 16 (step 70). The fast path 28 creates a flow entry in its table and sends the flow entry (load balancing information) to the flow director 26 so that the flow director can update its flow table 25 (step 72). The fast path 28 forwards the packet to the virtual machine 16 selected by the slow path (step 74). The virtual machine 16 generates a response packet, which is transmitted from the server 20 (step 76). The response packet is transmitted to the client without passing through the flow director 26.

It is to be understood that the processes illustrated in FIGS. 7 and 8 and described above are only examples and that steps may be added or removed without departing from the scope of the embodiments.

Load balancing may be based on loading information of the virtual machines 16, sticky information, or higher layer information such as URL (Uniform Resource Locators) within the connection. In some cases, this may require a TCP connection to be established and application data inspected before the connection can be transferred to the load balancing module that is co-located with the chosen virtual machine. This processing is performed by the slow path virtual machine 30 of the virtual load balancer module, as described below.

Referring again to FIG. 2, details of operation at the flow director 26 and virtual load balancers are described below for a Layer 3/Layer 4 HTTP session initiation, in accordance with one embodiment.

A TCP SYN (synchronize) packet received from the network 34 is transmitted on the load balancer VIP VLAN to the flow director 26 (FIG. 2). The TCP SYN packet is referred to herein as a 'request packet' and a TCP SYN/ACK (acknowledgement) packet transmitted from one of the virtual machines is referred to as a 'response packet'. The flow director 26 chooses the slow path virtual machine 30 to perform load balancing for a new flow. In one embodiment, when the flow director 26 detects new flows that are not already in its flow table, it distributes the flows in a pseudo-random manner to all virtual load balancers that are not currently overloaded and adds a new flow table entry for the flow. After selecting the virtual load balancer module, the flow director 26 creates forward flow pointing to the chosen virtual load balancer module. The flow director 26 also adds encapsulation to carry VIP VLAN and flow director ID, changes the server VLAN to the internal VLAN, changes the destination MAC address to the selected virtual load balancer module's MAC address, and forwards the packet on the internal VLAN (FIG. 2).

Upon receiving the packet on the internal VLAN from the flow director 26, the fast path logic 28 looks for the flow in its flow table 31. If no entry is found, the fast path 28 forwards the packet to the slow path virtual machine 30 at the server.

The virtual load balancer module (slow path 30) provides initial flow load balancing (e.g., choosing a virtual machine 16 from a server farm to process the flow). The initial flow load balancing is performed by the virtual load balancer module that was chosen by the flow director 26. The virtual load balancer module may select the virtual machine 16 based on, for example, VIP, TCP port, and VLAN. The virtual load balancer module finds the slow path virtual machine 30 co-located with the selected virtual machine 16 and creates a flow table entry for the selected virtual machine. Since the flow director 26 distributed the flow pseudo-randomly, it is possible that this virtual load balancer module is not co-located with the virtual machine 16 that is selected. For example, the flow director 26 may select the virtual load balancer module at server 20A and the slow path virtual machine 30 may select one of the virtual machines 16 located at server 20B, upon performing initial load balancing.

The slow path 30 changes encapsulation of the packet to carry the virtual machine ID. The packet retains the virtual IP VLAN and flow director ID. The slow path virtual machine 30 also changes the destination MAC address to the virtual load balancer module co-located with the selected virtual machine 16 and forwards the packet on the internal VLAN to the server at which the selected virtual machine is located (e.g., server 20B).

The packet is received at the fast path logic 28 at server 20B and the fast path creates forward and reverse flow table entries. The fast path 28 also copies packet headers and sends a copy to the flow director 26 with the new virtual load balancer module identifier (ID). The fast path 28 decapsulates the packet, changes the VLAN to the server VLAN, changes the source MAC address to the virtual load balancer module's MAC address, changes the destination MAC address to the selected virtual machine's MAC address, changes the destination IP address to the selected virtual machine's IP address, changes the destination TCP port to the selected virtual machine's port, and forwards the packet to the selected virtual machine 16.

The TCP SYN packet is received at the virtual machine 16, which transmits a TCP SYN/ACK (acknowledge) packet to the fast path 28. The fast path 28 performs a look up in its flow table and changes the server VLAN to the VIP VLAN. The fast path 28 also changes the source MAC address to the virtual load balancer module's MAC address, changes the destination MAC address to an address of a node in network 34, changes the source IP address to the virtual IP address, and changes the source TCP port to a virtual server port. The fast path 28 forwards the packet on the VIP VLAN to the network 34. The packet does not pass through the flow director 26.

Once the virtual machine load balancing decision has been made, the data path for the connection can be optimized by transferring the flow handling to the virtual load balancer module that is co-located with the selected virtual machine 16. As described above, the initial remote virtual load balancer module transfers the flow to the co-located virtual load balancer module. The virtual load balancer module also sends a change flow request to the flow director 26 so that any further incoming packets are forwarded directly to the co-located virtual load balancer module.

Once the flow is transferred to the co-located virtual load balancer module, the virtual load balancer module is responsible for ongoing flow processing. For simple layer 4 balancing, this consists of performing NAT/PAT between the virtual server VIP/Port to the real server IP/port as well as hopping the packet from the virtual server VIP VLAN to the real server VLAN. This processing may be performed in the fast path 28 using the server based network interface card 36 or virtual switch, for example. When higher level application processing is required, it is performed in the slow path virtual machine 30, as described above. In this case, the network interface card (or virtual switch) is used to transfer the packets directly between the slow path virtual machine 30 and the selected virtual machine 16 without traversing up/down the link to the switch 12.

The following describes details of operation at the flow director and virtual load balancer module 28, 30 for an HTTP request and response, in accordance with one embodiment.

A TCP packet (request packet) from a client is transmitted from a node on the network 34 to the flow director 26 on the VIP VLAN. The flow director 26 performs a look up in its flow table 25 and finds an entry for a flow associated with the request packet. The flow director 26 adds encapsulation to the packet to carry the VIP VLAN and flow director ID. The flow director 26 also changes the server VLAN to the internal VLAN and changes the destination MAC address to the virtual machine load balancer found in the flow table 25. The flow director 26 forwards the packet on the internal VLAN to the server containing the virtual load balancer module identified in the flow table. The fast path logic 28 at the server receives the packet and performs a look up in its flow table 31. The fast path 28 decapsulates the packet, changes the source MAC address to the MAC address of the virtual load balancer module located at the server, changes the internal VLAN to the server VLAN, changes the destination MAC address to the virtual machine's MAC address, changes the destination IP to the virtual machine's IP address, and changes the destination TCP port to the virtual machine's port. The fast path 28 forwards the packet to the virtual machine 16.

The virtual machine 16 receives the request packet transmitted from the client and transmits a response packet. The response packet is received at the fast path 28, which performs a look up in its flow table 31. The fast path 28 changes the server VLAN to the virtual IP VLAN, changes the source MAC address to the virtual load balancer module's MAC address, changes the destination MAC address to a MAC address of a node at the network 34, changes the source IP address to the virtual IP address, and changes the source TCP port to a virtual server port. The server forwards the packet on the VIP VLAN to the network 34. The packet does not pass through the flow director 26.

The following describes an example for handling IP fragmentation. This may occur, for example, if a first fragment is received out of order and before flow director flow is established, a first fragment to arrive is not the first fragment, the order of middle fragments is mixed, or the last packet is out of order. In one embodiment, an IP fragmentation hash table is created at the flow director 26. Hash functions are used based on VLAN/source IP/destination IP, IP protocol, or identification, for example. The flow director 26 creates the IP fragmentation hash table upon receiving the first arriving fragment. All fragments in the IP fragmentation table are buffered until the first fragment is received. A flow entry in the flow director's flow table is created and all sequential fragments are forwarded to the virtual load balancer module. The virtual load balancer module may also create an IP fragmentation hash table.

The following describes an example of a flow distribution mechanism that may be used at the flow director 26. Utilization data is collected, including virtual load balancer module utilization (in percent) indicators, calculated and reported by the virtual load balancer modules. Each control message to the flow director (e.g., add, move, delete flow) preferably contains a virtual load balancer module utilization percentage. The flow director 26 updates the virtual load balancer modules' utilizations and distributes them in buckets. The flow director 26 adjusts bucket boundaries if they have too few or too many virtual load balancer modules. The flow director 26 may then randomly select a virtual load balancer module from the bucket with the least loaded virtual load balancer modules. It is to be understood that this is only one example of a flow distribution mechanism for use at the flow director 26. The flow distribution algorithm used at the flow director is preferably non-complex so that it can be easily implemented in hardware.

In one embodiment, flow table entries at the flow director 26 are kept for a minimum of ten seconds. After a TCP connection is released, the flow may be removed from the table if it has been in the table for at least ten seconds. After the flow is removed from the flow director flow table 25, any remaining packets from the flow will go through load balancing at the slow path virtual machine 30 that contains the removed entry based on a hash performed at the flow director.

Load balancing may be performed based on information such as URL, SSL (secure socket layer) ID, stickiness, cookies, etc. Stickiness allows the same client to maintain multiple simultaneous or subsequent TCP or IP connections with the same real server for the duration of a session (e.g., e-commerce shopping cart).

The following describes an example of cookie based sticky load balancing. For a given cookie, a single virtual load balancer module in the system is chosen as the cookie sticky decision point. The virtual load balancer module selected as the decision point for a particular cookie is determined by performing a hash on the cookie value. The decision point virtual load balancer module stores the cookie to real server sticky decision and makes new decisions if the cookie sticky state has timed out. All virtual load balancer modules are eligible to be a decision point. When a remote virtual load balancer module receives a new TCP connection to load balance, it terminates the TCP connection and if no cookie is present, makes a load balancing decision. When the server responds with the cookie, the virtual load balancer module stores the cookie to the server sticky state in the decision point virtual load balancer module, as determined by performing a hash on the cookie. The decision point virtual load balancer module stores the cookie sticky state and responds to requests for the cookie sticky decision from any virtual load balancer module that requests it. When a new TCP connection is terminated by a remote virtual load balancer module, and a cookie is present, it performs a hash on the cookie to determine the decision point virtual load balancer module from which to request the server decision. If the decision point virtual load balancer module receives a request, but the cookie sticky information has timed out or the real server has failed, it makes a new load balancing decision for the cookie and stores it.

The cookie sticky decision point functionality is preferably distributed to each virtual load balancer module in the system. When a new virtual load balancer module is added to the system, the cookie hash table for determining the decision point virtual load balancer module is increased to add the new virtual load balancer module. This causes hashes for existing cookies to be redistributed from the existing virtual load balancer modules to different virtual load balancer modules, including the new virtual load balancer module. Each virtual load balancer module transfers its cookie sticky entries to the new decision points. During the transition time, new connection requests are still load balanced. While cookie sticky decision entries are being redistributed, each remote virtual load balancer module sends new cookie sticky decisions and requests to the new virtual load balancer module. If the new virtual load balancer module does not have a requested entry, it requests the information from the old virtual load balancer module. If the old virtual load balancer module does not have the decision because the cookie timed out or the server is down, the new virtual load balancer module makes new load balancing decisions.

The load balancing algorithm used at the virtual load balancer module is preferably dynamic (e.g., based on server response time, CPU (central processing unit) load, etc.). Each virtual load balancer module may periodically calculate the virtual machines percent of utilization for all co-located virtual machines. The virtual load balancer module may also periodically broadcast/multicast utilization of all of its co-located virtual machines.

Although the method and apparatus have been described in accordance with the embodiments shown, one of ordinary skill in the art will readily recognize that there could be variations made to the embodiments without departing from the scope of the embodiments. Accordingly, it is intended that all matter contained in the above description and shown in the accompanying drawings shall be interpreted as illustrative and not in a limiting sense.

What is claimed is:

1. A method comprising:
    receiving a request packet at a flow director in communication with a plurality of servers, each server comprising a virtual load balancer module and one or more virtual machines, the flow director operable to distribute flows to the virtual load balancer modules; and
    forwarding the request packet to one of the virtual load balancer modules, the virtual load balancer module configured to select one of the virtual machines to receive the request packet and transmit a response packet;
    wherein the virtual load balancers are configured to distribute request packets across a plurality of virtual machines;
    wherein the response packet is transmitted without passing through the flow director and wherein the virtual load balancer modules comprise a fast path portion and at least one of the virtual load balancer modules comprises a slow path portion, said fast path portion and said slow path portion located at the server in communication with the flow director, said slow path portion configured to perform load balancing to select one of the virtual machines and said fast path portion configured to create an entry in a flow table to identify the selected virtual machine; and
    wherein the flow director is configured to identify new flows and select one of the virtual load balancer modules to process said new flow, and respond to requests from the virtual load balancer modules to direct packets for a flow to a specified virtual load balancer module, wherein the specified virtual load balancer module may be a different module than was initially selected by the flow director.

2. The method of claim 1 further comprising performing a look up in a table at the flow director for a flow associated with the request packet and wherein forwarding the request packet to one of the virtual load balancer modules comprises selecting one of the virtual load balancer modules to distribute flows over the virtual load balancer modules, if said flow is not found in the look up table.

3. The method of claim 1 further comprising performing a look up in a table at the flow director for a flow associated with the request packet and finding an entry for said flow in the look up table, said entry comprising an identifier for one of the virtual load balancer modules and wherein forwarding the request packet to one of the virtual load balancer modules comprises forwarding the request packet to the virtual load balancer module identified in said entry.

4. The method of claim 1 wherein said fast path portion is located at a network interface card at the server.

5. The method of claim 1 wherein said fast path portion is located at a virtual switch at the server.

6. The method of claim 1 wherein said slow path portion comprises a slow path virtual machine.

7. The method of claim 1 further comprising creating an entry in a flow table at the virtual load balancer module based on the selected virtual machine and forwarding said entry to the flow director.

8. The method of claim 7 further comprising removing said entry from a flow table at the flow director after a connection has been released when said entry has been in the flow table for a specified period of time.

9. The method of claim 1 wherein the virtual machine selected by the virtual load balancer module is located at a different server than the virtual load balancer module.

10. The method of claim 1 wherein the flow director is located at a switch in communication with said plurality of servers.

11. The method of claim 1 wherein the flow director is located at another server in communication with said plurality of servers.

12. An apparatus comprising:
    an ingress interface for receiving a request packet;
    an egress interface in communication with a plurality of servers, each server comprising a virtual load balancer module and one or more virtual machines, wherein the virtual load balancers are configured to distribute request packets across a plurality of virtual machines;
    a flow director configured to forward the request packet to one of the virtual load balancer modules, the virtual load balancer module configured to select one of the virtual machines to receive the request packet; and
    a flow table for use in looking up a flow associated with the request packet;
    wherein the apparatus is configured such that a response packet is transmitted without passing through the flow director and wherein at least one of the virtual load balancer modules comprises a fast path portion and a slow path portion located at the server, said slow path portion configured to perform load balancing to select one of the virtual machines and said fast path portion configured to create an entry in a flow table to identify the selected virtual machine; and
    wherein the flow director is configured to identify new flows and select one of the virtual load balancer modules to process said new flow, and respond to requests from the virtual load balancer modules to direct packets for a flow to a specified virtual load balancer module, wherein the specified virtual load balancer module may be a different module than was initially selected by the flow director.

13. The apparatus of claim 12 further comprising a processor for performing a look up in a table at the flow director for a flow associated with the request packet.

14. An apparatus comprising:
    an interface for receiving request packets from a flow director in communication with a plurality of servers comprising a plurality of virtual machines;
    one or more of said plurality of virtual machines; and
    a virtual load balancer module configured to load balance said request packets across said plurality of virtual machines and transmit load balancing information to the flow director, the virtual load balancer module comprising a fast path portion located in a path between said ingress interface and said one or more virtual machines and a slow path portion, said slow path portion configured to perform load balancing to select said one of said plurality of virtual machines and said fast path portion configured to create an entry in a flow table to identify the selected virtual machine;

wherein the flow director is configured to identify new flows and select one of the virtual load balancer modules to process said new flow, and respond to requests from the virtual load balancer modules to direct packets for a flow to a specified virtual load balancer module, wherein the specified virtual load balancer module may be a different module than was initially selected by the flow director.

15. The apparatus of claim 14 wherein said fast path portion is located at a network interface card at the apparatus.

16. The apparatus of claim 14 wherein said slow path portion comprises a slow path virtual machine.

17. The apparatus of claim 14 wherein the fast path portion is operable to perform network address translation.

18. The apparatus of claim 14 wherein the slow path portion is configured to perform load balancing.

* * * * *